US009638562B2

(12) United States Patent
Wiedemann et al.

(10) Patent No.: US 9,638,562 B2
(45) Date of Patent: May 2, 2017

(54) FLUID MEASUREMENT DEVICE

(71) Applicant: Buerkert Werke GmbH, Ingelfingen (DE)

(72) Inventors: Juergen Wiedemann, Ingelfingen (DE);
Jan Magnussen, Ingelfingen (DE);
Norman Neumann, Niedernhall (DE)

(73) Assignee: BUERKERT WERKE GMBH, Ingelfingen (DE)

( * ) Notice: Subject to any disclaimer, the term of this patent is extended or adjusted under 35 U.S.C. 154(b) by 132 days.

(21) Appl. No.: 14/668,320

(22) Filed: Mar. 25, 2015

(65) Prior Publication Data

US 2015/0280358 A1 Oct. 1, 2015

(30) Foreign Application Priority Data

Mar. 26, 2014 (DE) .................. 10 2014 104 211

(51) Int. Cl.
| G01F 15/14 | (2006.01) |
| G01F 15/18 | (2006.01) |
| G01F 3/22 | (2006.01) |
| H01R 13/58 | (2006.01) |

(52) U.S. Cl.
CPC .............. *G01F 15/14* (2013.01); *G01F 3/226* (2013.01); *G01F 15/18* (2013.01); *H01R 13/5804* (2013.01)

(58) Field of Classification Search
CPC ...... G01F 3/226; G01F 15/063; G01F 15/068; G01F 15/14; G01F 15/18; H01R 13/5804
USPC ..................... 73/201, 273, 431; 439/449, 460
See application file for complete search history.

(56) References Cited

U.S. PATENT DOCUMENTS

| 3,794,960 A | * | 2/1974 | Sugar | ................. | H01R 13/5804 |
| | | | | | 439/459 |
| 6,044,701 A | * | 4/2000 | Doyle | ................. | G05D 7/0635 |
| | | | | | 73/202 |
| 6,402,307 B1 | * | 6/2002 | Wong | ................... | B41J 2/17513 |
| | | | | | 347/86 |
| 2005/0001888 A1 | * | 1/2005 | Seino | ................... | B41J 2/17503 |
| | | | | | 347/86 |
| 2011/0155874 A1 | | 6/2011 | Roehr et al. | | |

FOREIGN PATENT DOCUMENTS

| DE | 20218228 U1 | 4/2004 |
| DE | 102006049250 A1 | 4/2008 |
| DE | 102008044840 A1 | 3/2010 |

OTHER PUBLICATIONS

Article: F. Frommer, Test: "Cannon Pixma IP7250—Druckkopf und Tintenpatronen" in Druckerchannel.de, Nov. 2012. Available online under: http://www.druckerchannel.de/artikel.php?ID=3267, along with English translation thereof.
German Search Report issued in connection with the German counterpart application 10 2014 104 211.5.

* cited by examiner

*Primary Examiner* — Benjamin Schmitt
(74) *Attorney, Agent, or Firm* — Cowan, Liebowitz & Latman, P.C.; Steven D. Underwood

(57) ABSTRACT

A fluid measurement or control device has an outer housing with a corner portion cut out, in which an electric line connection is located and which optionally can be closed with a lid.

7 Claims, 7 Drawing Sheets

FLUID MEASUREMENT DEVICE

FIELD OF THE INVENTION

The invention relates to a fluid measurement device, in particular to a mass flow meter or regulator, with a cuboid outer housing which includes corner portions that each are defined by two side walls, an upper or lower side and a front or rear side, and with an electric line connection at the housing.

The term "fluid measurement device" comprises devices which are provided for measurement of fluid, only, but also comprises devices which control fluid. Such fluid measurement or control devices comprise a part which usually is traversed by a flow, and an electronic part. These two parts each can have a separate housing, wherein the housings then are attached to each other for forming the overall housing, or there can be provided one common housing. This common housing or the two individual housings attached to each other together form the aforementioned outer housing of the device. The electronic system of the device is connected from the outside by cable, in the following also referred to as electric line, which are releasably attached to the device, namely via an electric line connection. This electric line connection usually is provided on the rear side of the housing.

BACKGROUND

During assembly of the devices, which in batteries often are arranged one beside the other, it is important that the cables are not bent with too narrow a radius, wherein on the other hand a narrow radius is desired, in order to be able to accommodate the device also in narrow spaces or to arrange as many devices as possible one beside or behind the other.

It is the object of the invention to create a fluid measurement which ensures a safe, space-saving cable routing.

SUMMARY

The fluid measurement/control device as mentioned above comprises a corner portion of the housing which is cut out, i.e. is not physically cut out but provides a cut out area, wherein at this corner portion the front or rear side just like the upper or lower side are shortened and a shoulder is formed, and that in the shoulder the electric line connection is present.

The housing of the device according to the invention does not have a pure cuboid shape, since figuratively speaking a corner region is cut out or, in other words, retracted. There is formed a shoulder located in the interior of the virtual pure cuboid, so to speak, in order to accommodate an electric line connection. This means that the electric line connection is not provided on the rear side, so that the cable to be connected along with the connector only starts on the rear side. Rather, the cable connectable to the device according to the invention can extend in the region of the shoulder and hence protrude into the interior of the virtual cuboid, so to speak, where the electric line connection then is seated. The effective length of the device along with the connected cable is distinctly reduced as compared to the prior art, as the cable is not bent already at the cable ends, which strains the connection, but it can still be held and/or guided a bit after the connection, before it leaves the space enclosed by the pure cuboid.

The mechanical stability between device and cable hence is increased distinctly, and the actual space requirement of the device along with the cable is reduced considerably. In addition, the electric line connection is accommodated in the shoulder in a protected manner.

The electric line connection can be present on a retracted front wall of the shoulder, which so to speak can extend between front and rear side substantially in the same direction as front and rear side.

When the housing has an oblong cuboid shape, it was found to be advantageous to have the electric line connection point in longitudinal direction. This means that the connecting direction of the cable also is in longitudinal direction. The route of the cable within the imaginary, ideal cuboid hence is increased.

The electric line connection can be designed as plug-in connection for a clamping block, into which the individual strands are plugged and clamped, or for a round plug connection.

The plug connection can freely protrude into the space formed by the shoulder, in order to optimize its accessibility.

In direction of cable extension, the shoulder should be so long that the cable-side plug is located completely within the space formed by the shoulder. Preferably, the space should even be longer, for example a cable length of at least 15 mm should still be present after the plug within the space formed by the shoulder.

One embodiment of the invention provides that a lid covering the shoulder is provided. This lid protects the electric line connection and the electric line present in the shoulder, i.e. the cable, against external influences. Depending on the purpose for which the device is intended, a lid can be designed only for the mechanical protection of the cable and the line connection, or there can also be designed a lid which is formed against the ingress of moisture, water or dust, for example to comply with the so-called ATEX requirements. The invention also creates devices which satisfy an EX or UL approval.

Depending on its function, the lid should or is able to close the shoulder on all sides, in particular in that the lid closes the indentation in the cuboid, so that lid and outer housing form the cuboid. Slight lateral protrusions between lid and succeeding outer housing are possible, but need not necessarily be present.

The lid, as mentioned, is a separate part which optionally however can pivotally be mounted on the housing and/or can be coupled with the housing via a positive connection. This embodiment improves the mechanical stability of the unit of lid and housing.

For forming the positive connection, the lid can be inserted into a housing-side guideway, in particular the guideway in its longitudinal direction also extends in longitudinal direction of the cable. The guideway need not extend over the entire shoulder. It is also possible to have the guideway only extend over a short distance. As an alternative to the guideway, a short tab which is designed complementary to a recess also can lead to a positive connection between lid and housing.

The lid in particular has a cable lead-through opening which preferably is formed on its rear side extending parallel to the housing-side front or rear wall.

The cable lead-through opening can have a cross-section which is smaller than the cable-side plug connection, and in particular can be designed as keyhole opening. This provides for also utilizing the lid as pull-out protection for the cable, as it would not be possible to pull the cable with the plug attached to the same out of the lid or out of the space in the shoulder formed by lid and housing.

In addition, the cable lead-through opening should have a cross-section which is not greater than the cable cross-section, in order to achieve a certain tightness. In the region of the lead-through opening a seal might also be provided.

A further protection of the connection of the cable can be achieved in that at least one tab is formed on the inside of the lid. This tab only protrudes into connecting depressions at cable clamping elements when the plug is connected correctly, so that the lid can be closed. When for example in the case of a clamping block the cable clamping element presses against the strands due to small screws, tabs extend up to the screws. When the screws are not turned in completely, in order to clamp the strands, the tabs strike against the screw heads, so that the lid cannot be closed completely. Only when the screws are turned in sufficiently and the plug sits correctly, there is enough room for the tab or tabs, in order to be able to close the lid.

What is also conceivable, however, are embodiments in which the screws always are located at the same height (use of tension spring clamps) and the lid can be closed when the screws are not tightened yet. Then, the tabs only are relevant as pull-out protection for a plug correctly pressed in deeply.

For the further locking of the cable at the housing, one or more lead-through straps can be formed at the housing itself in the region of the shoulder. Through these lead-through straps one or more cable ties are guided for locking the electric line.

In addition, it is possible to surround cables with a metal foil or with a metal braiding in the region of the shoulder. The cable tie likewise can be made of metal and directly get in contact with the metal foil or with the metal braiding, in order to on the one hand achieve an FE shielding and on the other hand a grounding, which leads to an increase of the FE protection.

As mentioned above, the housing can have a multipart design, with a fluid-traversed fluid housing which then forms a base of the housing, and an electronic housing put onto the fluid housing.

The lid can be made of plastics, metal, for example also of aluminum, or be diecast.

Likewise, the housing also can be made of plastics or metal.

BRIEF DESCRIPTION OF THE DRAWINGS

FIG. 5 shows an enlarged sectional view of the fluid measurement/control device according to FIG. 3 in the region of the electric line connection.

DETAILED DESCRIPTION

Figure 1:
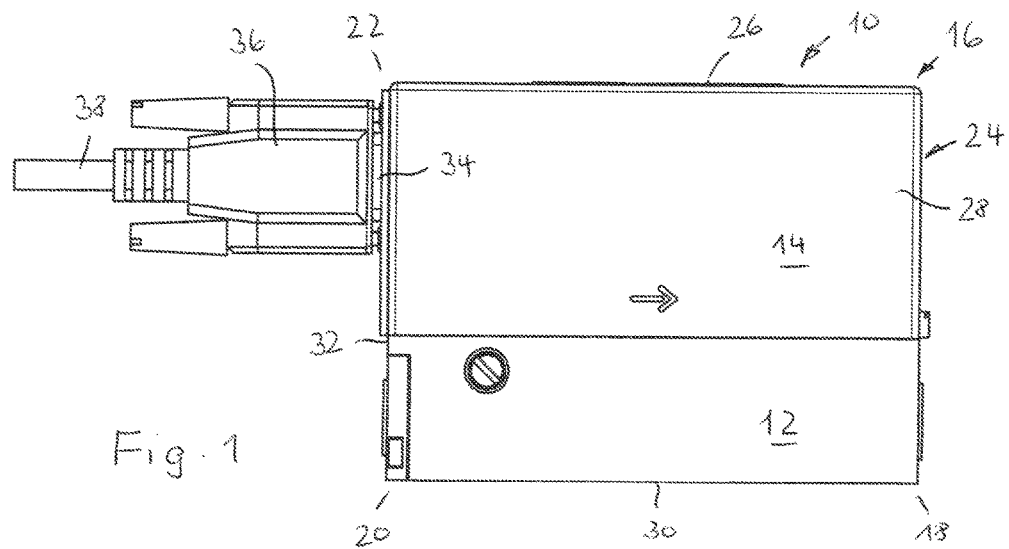
FIG. 1 shows a side view of a fluid measurement/control device according to the prior art.

FIG. 1 shows a fluid measurement device (also called fluid measurement or control device) provided for measuring and/or controlling fluid includes a multipart, cuboid outer housing 10. The outer housing comprises a fluid housing 12 which is traversed by fluid and forms a base of the outer housing 10. In the fluid housing 12, no electronic components are contained. On the fluid housing 12 an electronic housing 14 is seated, in which sensors and the electronic system of the device are accommodated. Fluid from the fluid housing 12 can be branched off into the electronic housing 14 for control, regulation and/or sensory purposes.

The cuboid outer housing 10 has corner portions 16-22. The corner portion 16 is defined by the sides or walls converging in this region, namely the side walls 28 extending substantially parallel to each other, of which only one side wall can be seen, the upper side 26 and the front side 24. The corner portion 18 is the region in which the side walls 28, a lower side 30 as well as the front side 24 converge. The corner portion 20 in turn is the region in which the side walls 28, a rear side 32 as well as the lower side 30 converge. Correspondingly, the corner portion 22 is defined by the region in which the side walls 28 and the upper side 26 as well as the rear side 32 converge.

In the region of the rear side 32 an electric line connection 34 is designed in a manner protruding from the housing, into which a plug 36 can be plugged, which is permanently attached to an electric line 38 with numerous strands.

As can be seen in FIG. 1, the device 10 is relatively long in longitudinal direction when the electric line is connected, as the plug 36 is stiff and leads to the assembly being lengthened.

Figure 2:
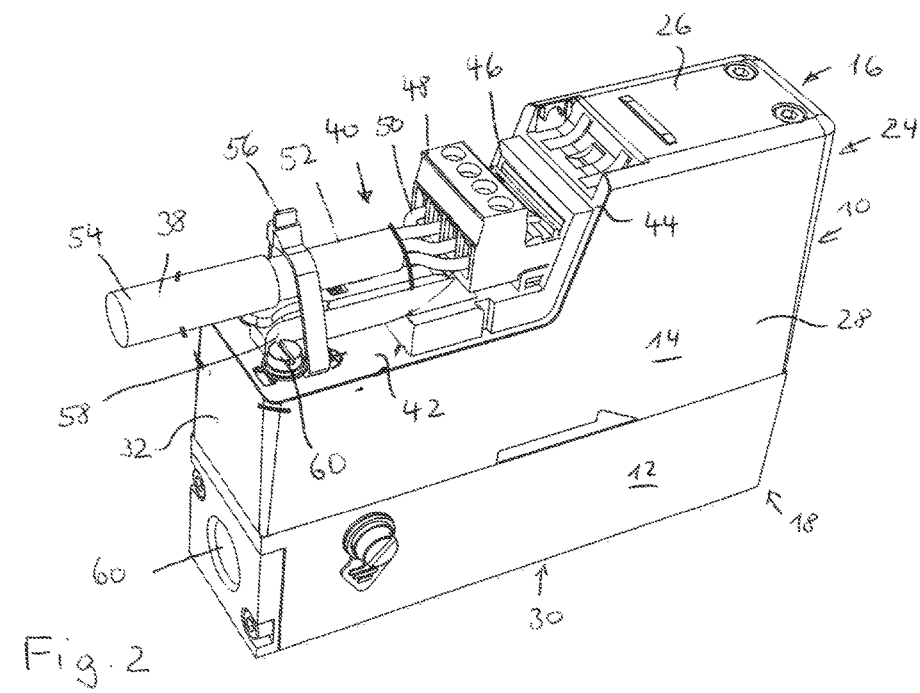
FIG. 2 shows a perspective view of an embodiment of a fluid measurement/control device according to the invention.

FIG. 2 shows a fluid measurement or control device according to the invention, which likewise has an outer housing 10 with a fluid housing 12 traversed by fluid and an electronic housing 14 put onto the same, which both are screwed to each other. With respect to the corresponding details reference can be made to FIG. 1, also as far as the individual walls, sides and surfaces are concerned, as the outer housing 10 is substantially cuboid here as well.

In contrast to FIG. 1, however, the corner portion 22 of the housing 10, more exactly of the electronic housing 14, is cut out in that here the rear side 32 and the upper side 26 are shortened, with the side walls 28 also being omitted in this region. This provides a shoulder 40 which on the housing side is defined by a recessed upper side 42 as well as a retracted front wall 44, which is spaced from the rear side 32.

In the shoulder 40, more exactly in the retracted front wall 44, an electric line connection 46 is provided on the housing side.

Into the electric line connection 46 a plug 48 is plugged, which here is designed as clamping block. In the clamping block 48 strands 50 of the electric line 38 are clamped.

Figure 7:
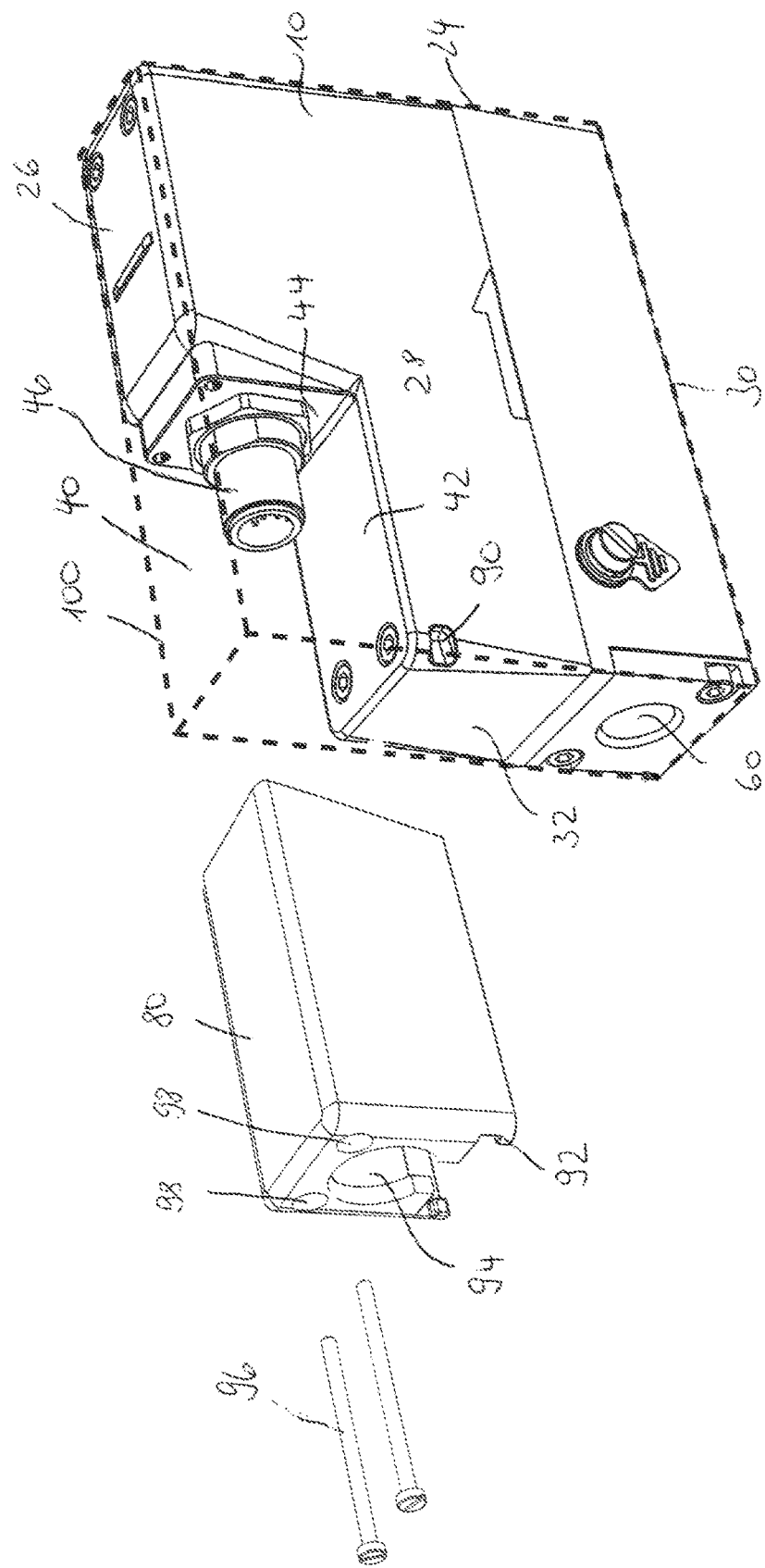
FIG. 7 shows a further embodiment of the fluid measurement/control device according to the invention in an exploded view.

In FIG. 7, to which with respect to the basic shape of the outer housing 10 reference can also be made with regard to the remaining embodiments, the fictitious cuboid 100 is shown, which circumscribes the outer housing 10 and in which the cutout 40 and the virtual space formed by the cutout 40 within the cuboid 100 can be seen.

The fact that the individual sides or walls in part are slightly beveled and the edges and corners are rounded does not change anything about the cuboid basic shape of the outer housing 10.

The corresponding cuboid 100 of course would also be shaped correspondingly for FIG. 2.

The shoulder 40 is so deep, i.e. the distance of the recessed upper side 42 to the upper side 26 is so large that the plug 48 does not protrude beyond the virtual cuboid 100, whose upper side here coincides with the upper side 26.

In contrast to the embodiment according to FIG. 1 it can also be seen that a part of the electric line 38 also still lies within the cuboid 100 and the shoulder 40.

More exactly, the partly stripped strands 50 can be seen, so that there is a region 52 in which the outer insulation 54 is removed. In this region 52, a metal foil or a metal braiding surrounds the strands 50.

To in addition achieve grounding in the region 52, a preferably metallic cable tie 56 is provided, which is guided around a housing-side lead-through strap 58 and on the housing side additionally is secured and contacted with a metal screw 60.

The cable tie 56 thus has a dual function, in that on the one hand it ensures a ground contact and on the other hand produces a positional and pull-out protection for the cable 38.

The region with the insulation 54 also extends into the space defined by the shoulder 40.

FIG. 2 moreover also shows an inlet opening 60 in the fluid housing 12.

Figure 9:
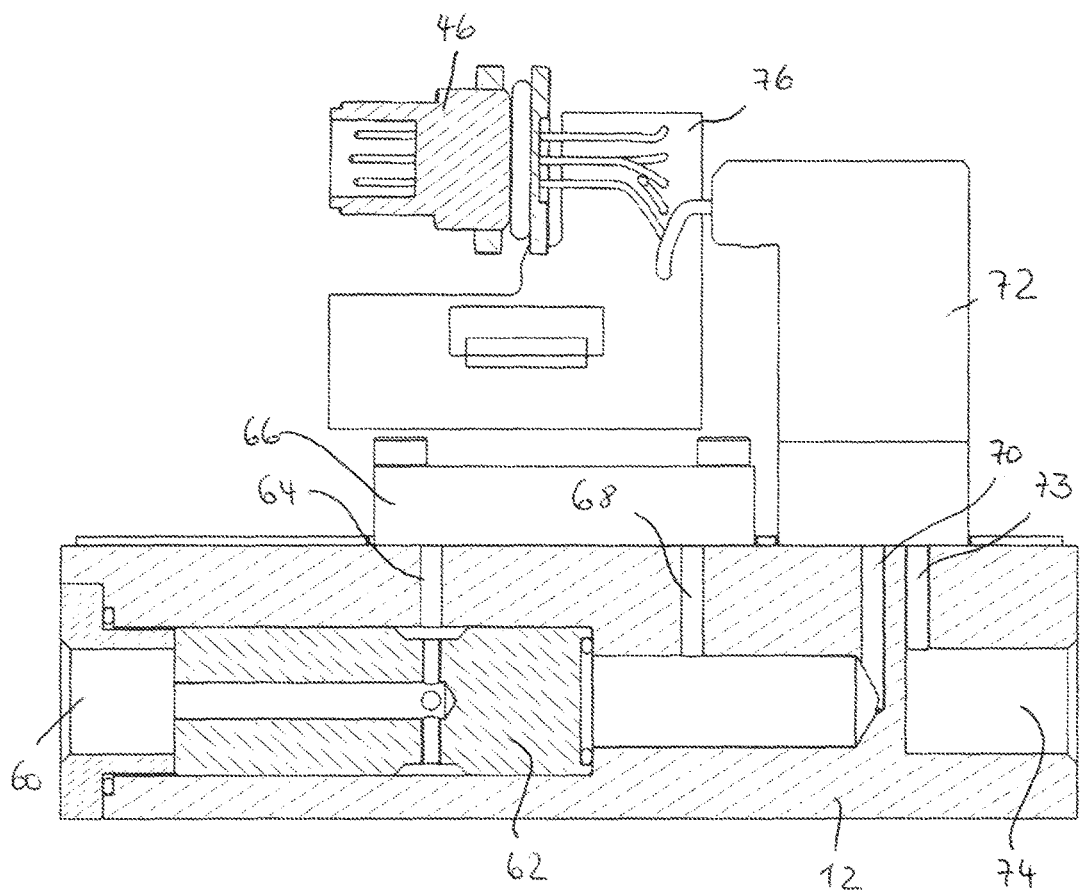
FIG. 9 shows a schematic sectional view through a fluid measurement/control device according to the invention partly with omitted housing.

FIG. 9 shows a section which substantially is the same for all embodiments and in which the inlet opening 60 can be seen, via which fluid flows into a so-called fluid conditioning element 62 within the fluid housing 12 and from which a bypass 64 gets into a sensor unit 66, from which a further bypass 68 flows back into the fluid housing 12. In use for a fluid control device (which also should include a regulating device), an inlet 70 into a valve 72 is present as well as an outlet 73 which opens into an outlet opening 74 in the fluid housing 12. The bypass 64 here can be omitted. In a fluid measurement device, on the other hand, the valve 72 is not present.

The sensor unit 66 and/or the valve 72 are actuated electronically. For this purpose, a printed circuit board 76 is provided, from which corresponding lines lead to the electric line connection 46.

The electronic housing is omitted in FIG. 9 for simplification, just like the connecting lines to the sensor unit 66 and to the valve 72.

FIGS. 3 to 6 show a variant of the embodiment according to FIG. 2, which in essence only differs from the embodiment according to FIG. 2 in one point, so that all previously introduced reference numerals are maintained for identical or functionally equivalent parts or portions and these details no longer need to be discussed.

In the embodiment according to FIGS. 3 to 6 the space defined by the portion 40 within the cuboid 100 optionally is closed by a lid 80.

In this embodiment, which is not to be understood in a limiting sense, the lid 80 is pivotally attached to the housing 10, here to the electronic housing 14.

Figure 6:
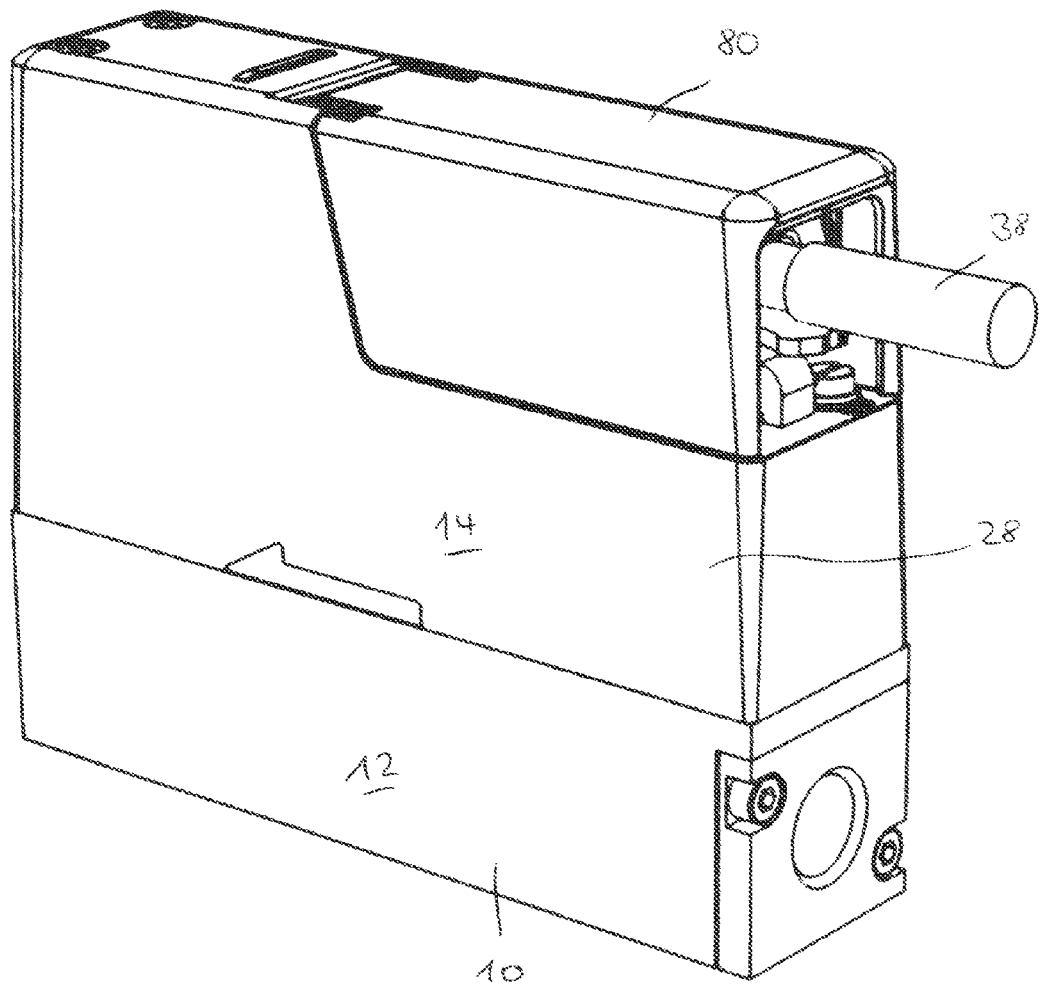
FIG. 6 shows a further view of the inventive fluid measurement/control device according to FIG. 3 with closed lid.

As shown in FIG. 6, the lid 80 closes the space which is formed by the shoulder 40 and completes the cuboid shape.

Preferably, the lid 80 adjoins the corresponding sides of the outer housing 10 with its outer surfaces, preferably even without any shoulder or protrusion.

Figure 3:
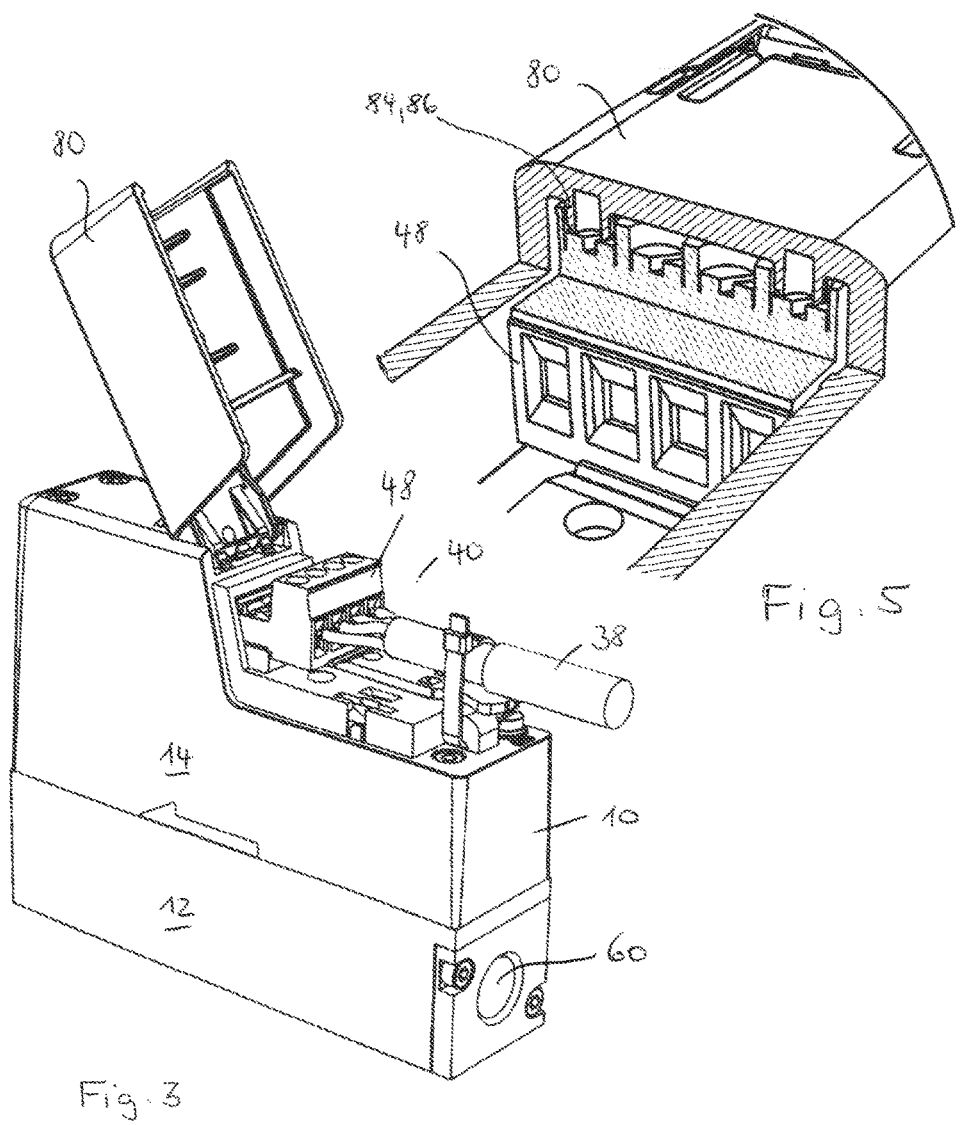
FIG. 3 shows a further embodiment of the fluid measurement/control device according to the invention.

In this embodiment, the rear side of the lid 80 preferably is completely open, which likewise is not to be understood in a limiting sense, so that in the connected condition of the electric line 38 the lid 80 can simply be folded over the electric line (see FIGS. 3 and 6). Alternatively, however, it is also possible to provide a seal in the region of the rear side, which offers dust or splash protection or the like.

In addition, non-illustrated latching noses are provided between lid 80 and outer housing 10, so that on closing the lid 80 snaps into place and remains in the closed position shown in FIG. 6.

Figure 4:
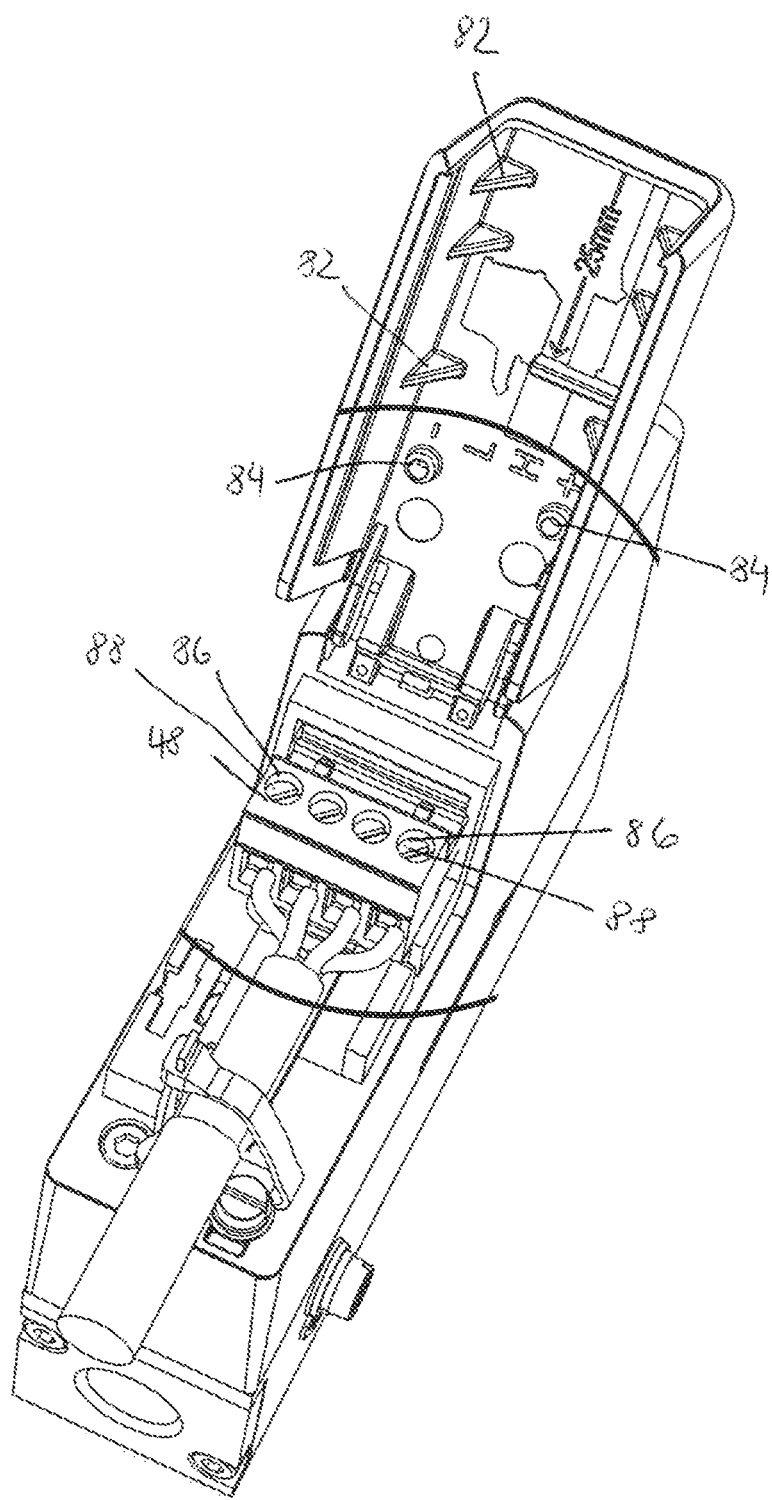
FIG. 4 shows a perspective top view of the fluid measurement/control device according to FIG. 3.

On the lower side of the lid 80, which is shown in FIG. 4, information is cast into the lid or printed onto the same, namely via the electric connections, for example plus and minus, but also the necessary stripping length (here 25 mm).

Due to the fact that ribs 82 also protrude on the lower side of the plug, it is not possible to pull the plug 48 out of the space closed by the lid 80, when the lid 80 is latched, as the plug 48 would strike against the ribs 82. The open rear side of the lid 80 thus forms a cable lead-through opening with a cross-section which is smaller than the corresponding cross-section of the plug 48, so that a pull-out protection is formed in pull-out direction parallel to the electric line direction.

In FIG. 5, in which the plug 48 and the lid 80 partly are cut open, a further pull-out protection as well as a protection to ensure the technically correct connection of the strands 50 on the one hand and of the proper connection between plug 48 and electric line connection 46 on the other hand can be seen. FIG. 4 also shows this additional protection.

From the lower side of the lid 80 tabs 84 protrude, which with proper connection of the plug penetrate into connecting depressions or, generally, depressions 86 on the upper side of the plug 48. The adjustment between the length of the tabs 84 and the location of the depressions 86 is made such that the tabs 84 only can penetrate into the depressions 86 when the plug 48 is plugged into the electric line connection 46 completely and correctly. In addition, the cable clamping elements to be seen in FIG. 4, for example clamping screws 88, also must be turned in deeply enough and hence clamp the strands 50. In the condition as delivered, these clamping screws 88 namely are turned upwards.

When these prerequisites for positioning the tabs 84 are not met, the lid 80 cannot be closed completely. It hence is clear that a contact problem does exist.

The embodiments according to FIGS. 3 and 6 achieve an IP 20 protection.

Except for the modifications mentioned below, the embodiment according to FIGS. 7 and 8 corresponds to the aforementioned embodiments, so that for identical or functionally equivalent parts the reference numerals already introduced are maintained and with respect to these parts and their functions reference can be made to the aforementioned explanations.

In the embodiment according to FIG. 7, the electric line connection 46 is a round plug connection protruding from the front wall 44 and extending into the space formed by the shoulder 40, for example a so-called M12 connection.

In addition, the lid 80 is not pivotally attached to the outer housing 10, but can be slid open.

For this purpose, a more or less long guideway can be formed between lid 80 and housing 10. In the embodiment according to FIG. 7, this guideway is relatively short, in that an indentation 90 each is formed at the edges from the rear side 32 to the side walls 28, to which a complementary, lid-side protrusion 92 each is designed.

Figure 8:
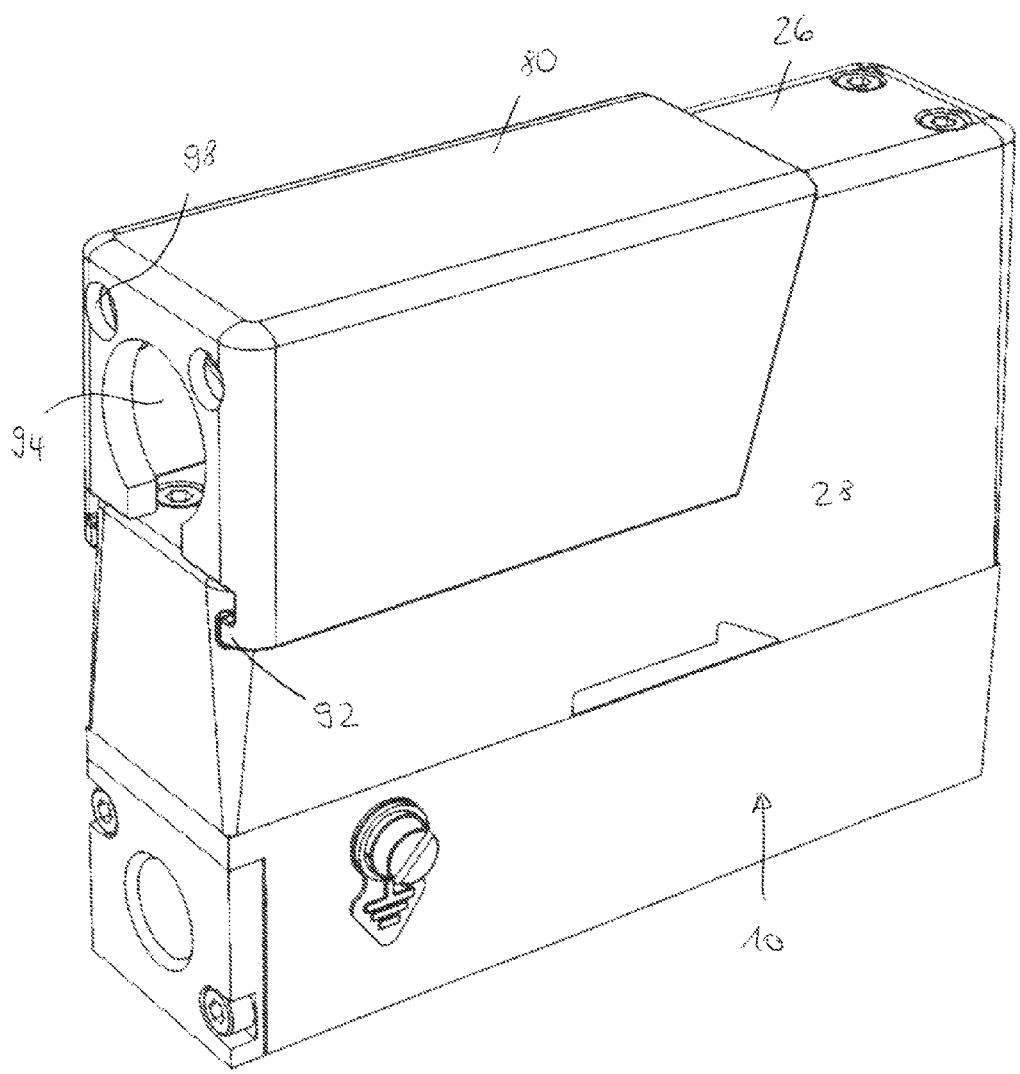
FIG. 8 shows the fluid measurement/control device according to FIG. 7 with closed lid.

In the embodiment according to FIGS. 7 and 8, the lid 80 slightly protrudes from the side walls 28 and the upper side 26, but the cuboid shape nevertheless is given.

In this embodiment, the protection with the cable tie 56 and the corresponding tab at the lid is omitted, which however only is the case optionally.

The cable lead-through opening 94 on the rear side of the lid 80 is designed like a keyhole, which allows plugging in of the electric line from the open, lower side of the opening. The corresponding plug at the electric line, which is designed as round plug, however is so large then that here as well pulling the plug out of the lid 80 is not possible due to the cross-sectional adaptation of the plug outer shape and the cable lead-through opening 94.

The retention of the lid 80 at the housing is not effected via the guideway, but also via screws 96 which through openings 98 on the rear side of the lid can be turned into threads in the front wall 44.

Toolless opening of the lid 80 and pulling off the plug thereby is not possible, which contributes to the protection of the connection.

Moreover, due to the keyhole geometry however releasing and pulling off the lid 80 is feasible with the plug connection still existing.

Depending on the requirements to be fulfilled by the lid 80, the same can be made of plastics or metal, for example also of diecast aluminum.

It should also be emphasized that the type of the plug and of the electric line connection 46 nothing has to do with the shape and kind of the lid 80 necessarily to the effect that for example only a pivotable lid 80 can be combined with a plug 48 as bearing block. All of the combinations shown in the embodiments also can be mixed with each other, this apparently is easily possible in technical terms.

In the illustrated embodiments, the outer housing 10 in addition has an oblong cuboid shape, in that the length measured over the bottom side 30 is greater than the height and width measured over the front side 24.

The electric line connection 46 preferably points in this longitudinal direction, which also corresponds to the connecting direction and the direction of extension of the electric line 38.

Depending on the embodiment of the lid 80, the entire device hence can pass an impact test, but also achieve types of protection such as IP65 or ATEX or approvals such as EX and UL.

The device shown in particular is a mass flow meter or mass flow regulator for a fluid.

The invention claimed is:

1. A fluid measurement device, with
a cuboid outer housing, which includes corner portions that each are defined by two side walls, one of an upper side and a lower side and one of a front side and a rear side, and
with an electric line connection at the outer housing,
the outer housing having a corner portion designed as a cut out section, the corner portion being defined by
the front or rear side and the upper or lower side being shortened and
a shoulder in the outer housing limiting the cut out section, and
the electric line connection being provided in the shoulder, wherein the electric line connection is a connection for one of a clamping block and a round plug connection.

2. The fluid measurement device according to claim 1, wherein on the outer housing in the region of the shoulder a lead-through strap is formed, through which a cable tie is guided for locking the electric line.

3. A fluid measurement device, with
a cuboid outer housing, which includes corner portions that each are defined by two side walls, one of an upper side and a lower side and one of a front side and a rear side, and
with an electric line connection at the outer housing,
the outer housing having a corner portion designed as a cut out section, the corner portion being defined by
the front or rear side and the upper or lower side being shortened and
a shoulder in the outer housing limiting the cut out section, and
the electric line connection being provided in the shoulder,
wherein a lid covering the shoulder is provided, which can be attached to the outer housing, wherein the lid has a cable lead-through opening.

4. The fluid measurement device according to claim 3, wherein the cable lead-through opening is provided at a rear side of the lid which is arranged adjacent of the housing's rear side.

5. The fluid measurement device according to claim 3, wherein the cable lead-through opening has a cross-section which is smaller than a cable-side plug to form a pull-out protection for the electric line.

6. The fluid measurement device according to claim 5, wherein the cable lead-through opening being formed as keyhole opening.

7. A fluid measurement device, with
a cuboid outer housing, which includes corner portions that each are defined by two side walls, one of an upper side and a lower side and one of a front side and a rear side, and with an electric line connection at the outer housing,
the outer housing having a corner portion designed as a cut out section, the corner portion being defined by
the front or rear side and the upper or lower side being shortened and
a shoulder in the outer housing limiting the cut out section, and
the electric line connection being provided in the shoulder,
wherein the fluid measurement device is one of a mass flow meter and a mass flow regulator,
wherein the fluid measurement device comprises an inlet opening and an outlet opening which are in fluidic communication,
wherein a lid covering the shoulder is provided, which can be attached to the outer housing,
wherein on the inside of the lid at least one tab is present, which only in the case of a correct plug connection penetrates into a plug-side depression, and
wherein a cable clamping element is provided at the end of the cable to form a plug, wherein single cables are clamped in the cable clamping element, the cable clamping element having a connecting depression, the tab extending into said connecting depression, the depth of the connecting depression being adapted to the length of the tab so that the lid can be closed only in the case of a correct clamping of the cable in the cable clamping element.

* * * * *